(12) United States Patent
Wenstrand et al.

(10) Patent No.: US 9,470,333 B1
(45) Date of Patent: Oct. 18, 2016

(54) WATER VALVE

(71) Applicant: Hawkeye Steel Products, Inc., Houghton, IA (US)

(72) Inventors: Thomas Wenstrand, Houghton, IA (US); Lewis Van Winkle, Houghton, IA (US); Jonathan Reed Wenstrand, Houghton, IA (US)

(73) Assignee: Hawkeye Steel Products, Inc., Houghton, IA (US)

( * ) Notice: Subject to any disclaimer, the term of this patent is extended or adjusted under 35 U.S.C. 154(b) by 100 days.

(21) Appl. No.: 14/195,322

(22) Filed: Mar. 3, 2014

(51) Int. Cl.
*F16K 31/18* (2006.01)
*F16K 31/24* (2006.01)
*F16K 31/34* (2006.01)

(52) U.S. Cl.
CPC ............... *F16K 31/24* (2013.01); *F16K 31/34* (2013.01); *Y10T 137/7439* (2015.04); *Y10T 137/7475* (2015.04); *Y10T 137/7485* (2015.04)

(58) Field of Classification Search
CPC .............. A01K 7/04; Y10T 137/7449; Y10T 137/7485; Y10T 137/7475; Y10T 137/7439; Y10T 137/7358; Y10T 137/053; Y10T 137/3068; Y10T 137/3077; Y10T 137/6004; Y10T 137/7329; Y10T 137/7371; F16K 31/34; F16K 31/24

USPC ....... 137/400, 409, 434, 437, 445, 448, 192, 137/195, 397, 398, 447; 119/74, 77, 78
See application file for complete search history.

(56) References Cited

U.S. PATENT DOCUMENTS

| | | | | |
|---|---|---|---|---|
| 1,081,110 A | * | 12/1913 | Gondolf | ................. E03D 1/087 137/410 |
| 2,020,463 A | * | 11/1935 | Fillmann | ................. F16K 31/34 137/400 |
| 3,310,065 A | * | 3/1967 | Godshalk | ............. A01K 39/024 119/78 |
| 4,393,890 A | * | 7/1983 | Skappel | ................. F16K 17/36 137/78.2 |
| 8,430,119 B2 | * | 4/2013 | Fackler | .................... A01K 7/04 119/78 |

* cited by examiner

*Primary Examiner* — Craig J Price
(74) *Attorney, Agent, or Firm* — Shuttleworth & Ingersoll, PLC; Brett Papendick (57) ABSTRACT

A water valve having dual mechanisms for controlling the flow of water for both high pressure and low pressure applications. The first mechanism controlling the flow of water out of a first opening and the second mechanism controlling the flow of water out a second opening. The mechanisms work together to control the flow of water from a closed position to an open position.

15 Claims, 9 Drawing Sheets

WATER VALVE

BACKGROUND

This invention relates to water valves used in supplying water to a variety of containers including animal drinkers and toilets. Water valves are used in a variety of commercial and residential applications. A typical water valve works on leverage and is designed to work at a predetermined range of water pressures.

A general summary of the existing typical mechanism for filling a container such as an animal drinker is as follows. A ballcock or pilot fill valve in the tank is connected to a pressurized water line. As the tank drains, a float connected to the ballcock or pilot fill valve via a float arm descends. The lowering of the float activates the ballcock or pilot fill valve and it begins to refill the tank with water. The tank continues to refill as the float connected to the ballcock or pilot fill valve rises. Once the float reaches a predetermined height indicating that the tank is full, the ballcock or pilot fill valve completely turns off. As pressures increases, an increasingly larger float and longer float arm is required.

It is therefore an object of the invention to provide a water valve that can work at a range of water pressures.

It is yet another object of the invention to provide a water valve that can shut off at low pressure.

If is a further object of the invention to provide a water valve that can shut off at high pressure.

SUMMARY OF THE INVENTION

The invention is a water valve which has dual mechanisms that allow the valve to operate at a range of water pressures. A float arm attached to a buoyant device, typically a float, exerts pressure on a sealing member or rocker. A piston also exerts pressure on the sealing member. Together the pressures keep a first passageway in a closed position. A second passageway remains in a closed position with the pressure generated by the float arm on a lever portion of the device. The second passageway is selectively closed by a pilot.

The valve is attached to a water supply and is housed within a container which is fillable with water, such as an animal drinker. The valve has a body which contains a first cavity and a second cavity. The piston preferably has a tail which the tails substantially occupies a connection between the first and second cavity. The tail aids in prolonging the life of the device and assists in cleaning debris.

In the closed position, water has filled the container such that the float arm has been rotated around a secondary fulcrum and the force is applied to the sealing member to at least partially assist in closing a first opening in liquid communication with the first passageway. Additionally the water supply has flooded the first two cavities, which puts pressure on the piston which in turns puts additional pressure on the sealing member. This pressure on the sealing member rotates the sealing member such that it also assists in keeping the first opening closed. The lower the water pressure, the greater amount of the force is generated by the float arm's movement in closing the first opening. The higher the water pressure, the greater amount of the force is generated by the piston's movement in closing the first opening. Typically, the low end of the water pressure range is between 3-5 psi. When the container is filled with water, the valve arm also applies pressure to the lever which in turn puts pressure on the pilot. In this closed position, a second passageway is also blocked.

When a user activates a device containing the water valve, for example by flushing the toilet, the container of water is emptied. In the context of an animal waterer, as an animal continues to drink, the device will eventually activate once the animal has drank a sufficient quantity of liquid. As the water level in the container lowers, the float arm rotates around the secondary fulcrum such that the lever applies less press to the pilot. Water begins to escape the second cavity out of the second passageway which reduces the pressure on the piston. Accordingly, the piston puts less pressure on the sealing member which allows the sealing member to rotate about the primary fulcrum. With no pressure behind the piston, the water exits the first passageway through the first opening.

The exiting of the water through the first opening, and in some degree through the second opening, begins to fill the container. The refilling of the container causes the water level to rise such that the float arm is rotated. The float arm then puts pressure on the lever which puts pressure again on the pilot which closes the second passageway. The second cavity is filled with water which puts pressure on the piston. The piston then applies pressure on the sealing member such that it rotates around the primary fulcrum. At some point the first opening of the first passageway is closed. The valve remains in the closed position until once again activated by a user.

DETAILED DESCRIPTION

Figure 1:
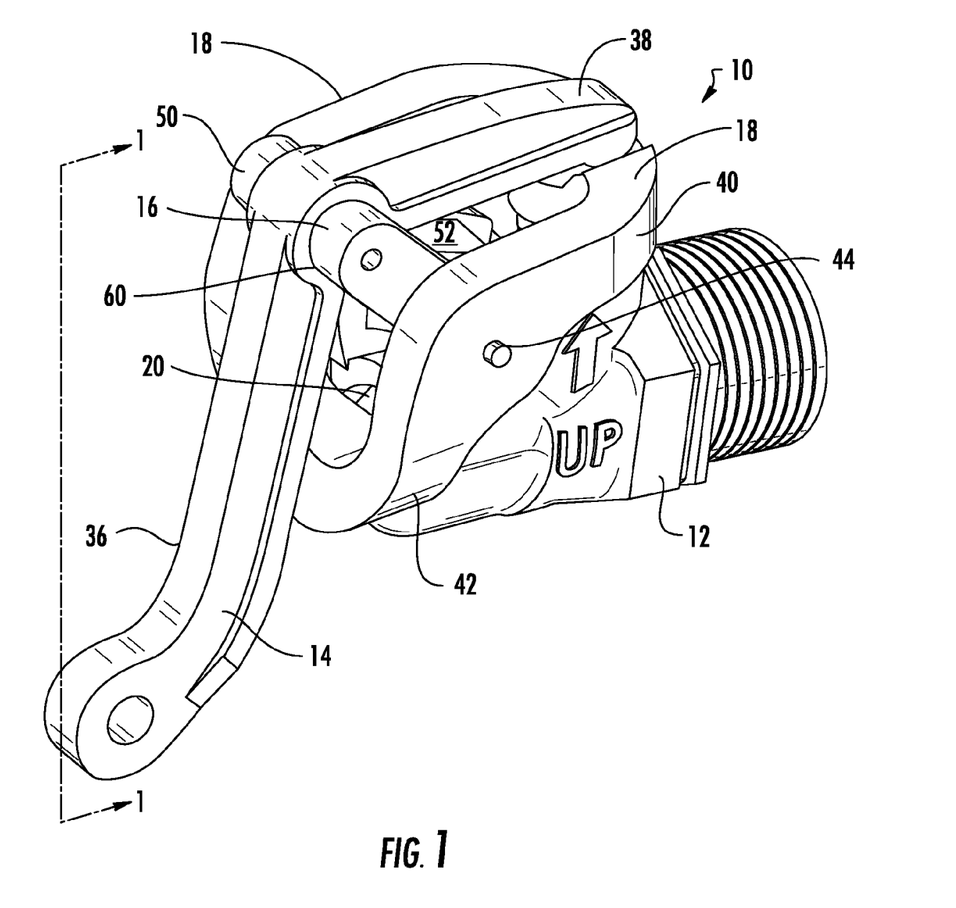
FIG. 1 is a perspective view of the invention.
Figure 2:
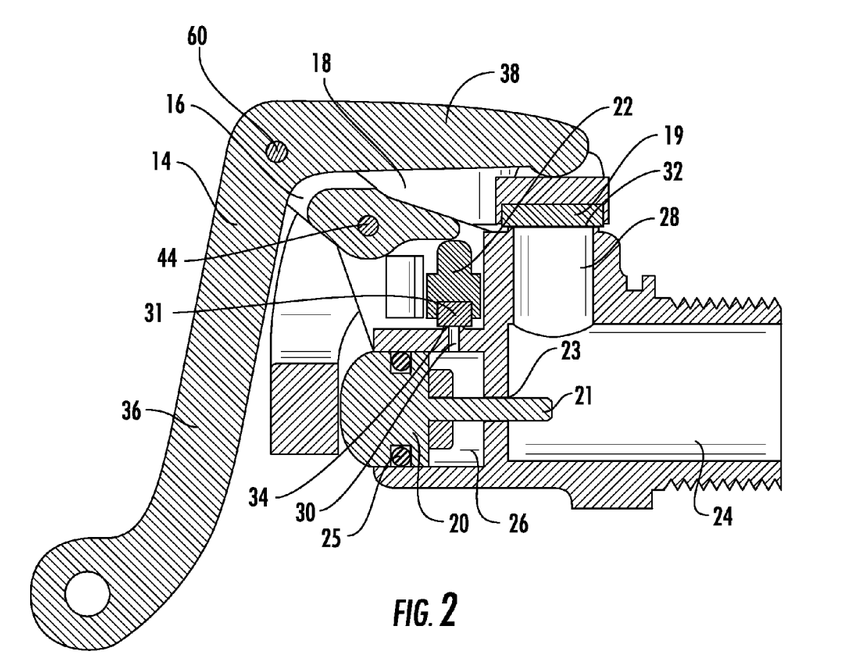
FIG. 2 is a cross-section view of the invention taken at line 1-1 of FIG. 1 showing the water valve at a fully closed position.

Now referring to the drawings, FIGS. 1 and 2 show the preferred embodiment of the invention. A water valve 10 comprises a body 12, a float arm 14, a lever 16, a sealing member 18, a piston 20, and a pilot 22.

As seen in FIG. 2, the body 10 comprises a first cavity 24 and a second cavity 26 which are in fluid communication with one another via a tunnel 23. The body further comprises a first passageway 28 and a second passageway 30. The first passageway 28 has a first opening 32 and the second passageway has a second opening 34. The float arm 14 is preferably L-shaped with a first section 36 and a second section 38 wherein second section 38 is substantially perpendicular to the first section 36. The sealing member 18 is preferably shaped such that it has an upper portion 40 and lower portion 42 and is pivotable around a primary fulcrum 44.

The lever 16 comprises lever arms 50 that extend from a lever body 52. The arms 50 extend partially around the float arm 14, preferably at the location where the first section 36 meets the second section 38. The arms 50 are pivotable around a secondary fulcrum 60. The lever body 52 is also pivotable around the primary fulcrum 44.

The piston 20 occupies at least a portion of the second cavity 26. The piston 20 has a tail 21 which is located in the tunnel 23. The piston 20 is selectively movable within the second cavity 26 such that it exert a range of force on the sealing member 18. A gasket 25 assists in maintaining a water tight seal. A pilot 22 comprises a pilot seal 31 which selectively covers a second end of the second passageway 30.

The parts described above will now be explained in operation of the water valve 10, beginning with the valve in a fully closed position to a partially open position to a fully opened position. As seen in FIG. 1, the body 12 is attached to a water supply (not shown) wherein the valve 10 is located above water. A typical location for use of the valve 10 would be in a standard toilet. As seen in FIG. 2, the valve 10 is in a fully closed position. A float (not shown) is attached to the first section 36 of the float arm 14. As the buoyancy of the float pushes the float arm 14 upward, a force is generated such that the float arm rotates clockwise (as shown in FIG. 2) and puts force on the sealing member 18. The sealing member 18 has a seal 19 which covers the opening of the first passageway 28. Additionally, the water supplied by the water supply has flooded the first cavity 24 and the second cavity 26, thereby forcing the piston 20 to make contact with the sealing member 18. The force from the water on the piston 18 causes the sealing member 18 to also rotate (clockwise in FIG. 2) on the primary fulcrum 60 and this puts additional force on the opening of the first passageway. The force supplied by the float arm and the sealing member maintain the opening of the first passageway in a closed position. Depending on the water pressure, the force generated by the float arm and the force generated by the piston will contribute to varying degrees in maintaining the opening of the first passageway in a closed position. In low pressure applications, the float arm 14 will provide sufficient force on the sealing member 18 to close the valve 10 without the piston 20 functioning. In high pressure applications, the piston provides most of the force to maintain the closed position. The force from the float arm 14 also pushes against the lever 16 such that the lever 16 then pushes on the pilot 22. The pilot seal 31 is therefore maintained in a position that keeps the opening of the second passageway closed.

Figure 3:
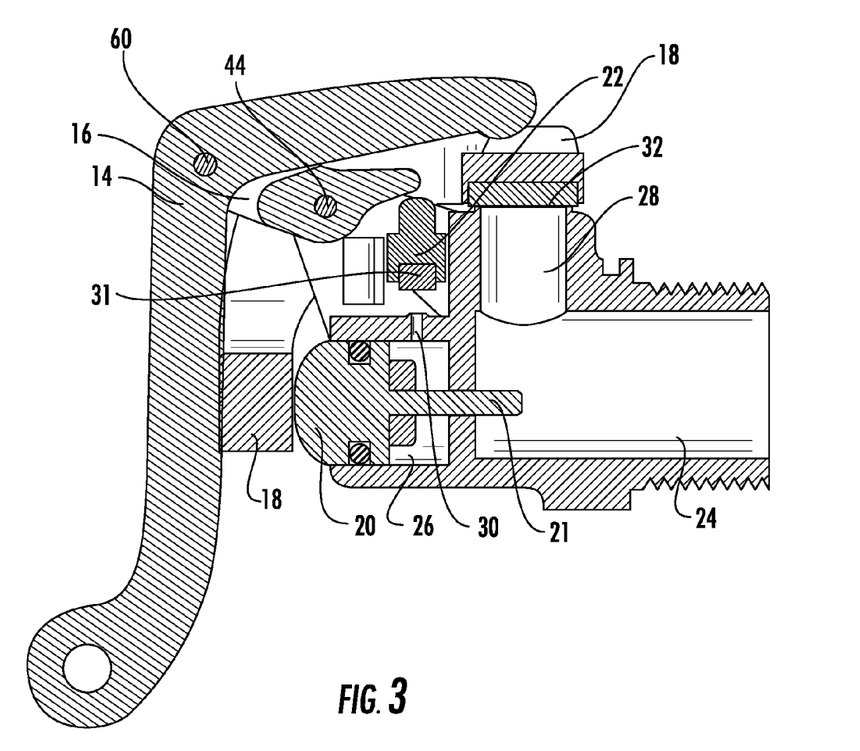
FIG. 3 is a cross-section view of the invention taken at line 1-1 of FIG. 1 showing the water valve at a partially closed position when beginning the opening process.

Once the water drops a certain level, the force exerted by the float valve on the float arm 14 will begin to lessen and when the water drops further, the upward force will eventually cease all together. As the force lessens, the float arm 14 falls (rotate counterclockwise in FIG. 3) which in turn forces the lever 16 to turn counterclockwise about the primary fulcrum 44. With the lever 16 turning, the force applied by the lever against the pilot 22 also lessens such that the water pressure against the pilot seal 31 exits the opening 34 of the second passageway 30. As water exits the opening 34, pressure on the piston 20 is greatly reduced, and the sealing member 18 forces the piston 20 toward the first cavity 24. The lateral movement of the piston 20 is away from the sealing member 18. The lateral movement of the piston 20 reduces the amount of force on the sealing member 18 which assists in allowing the sealing member 18 to rotate counter-clockwise around the primary fulcrum 44. This in turn further reduces the pressure on the opening of the first passageway 38. Water then exits the opening of the first passageway 28 and along with water exiting the opening of the second passageway 30 begins to fill the container (not shown).

Figure 4:
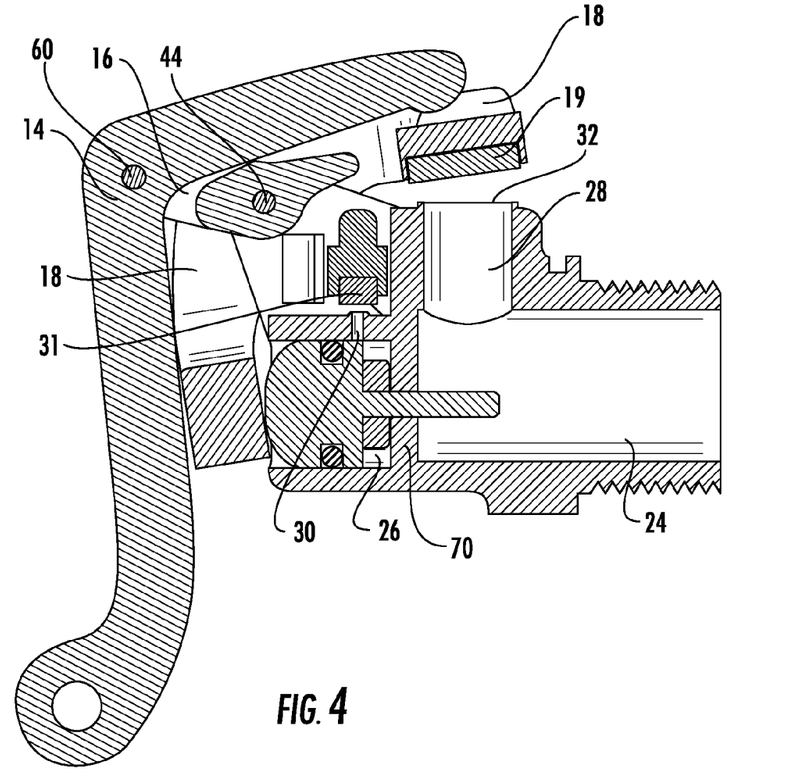
FIG. 4 is a cross-section view of the invention taken at line 1-1 of FIG. 1 showing the water valve at a fully open position.

FIG. 4 shows the valve 10 in the fully opened position. In the fully opened position, the piston 20 has reached or substantially reached a wall 70 which separates the first cavity 24 from the second cavity 26. The opening of the first passageway 28 is fully opened and the float arm 14 is pressing on the sealing membrane 18 which in turn presses on the piston 20. Additionally, the second opening 34 is in an open position which allows water to exit the second opening 34 and continue to fill the container.

Figure 5:
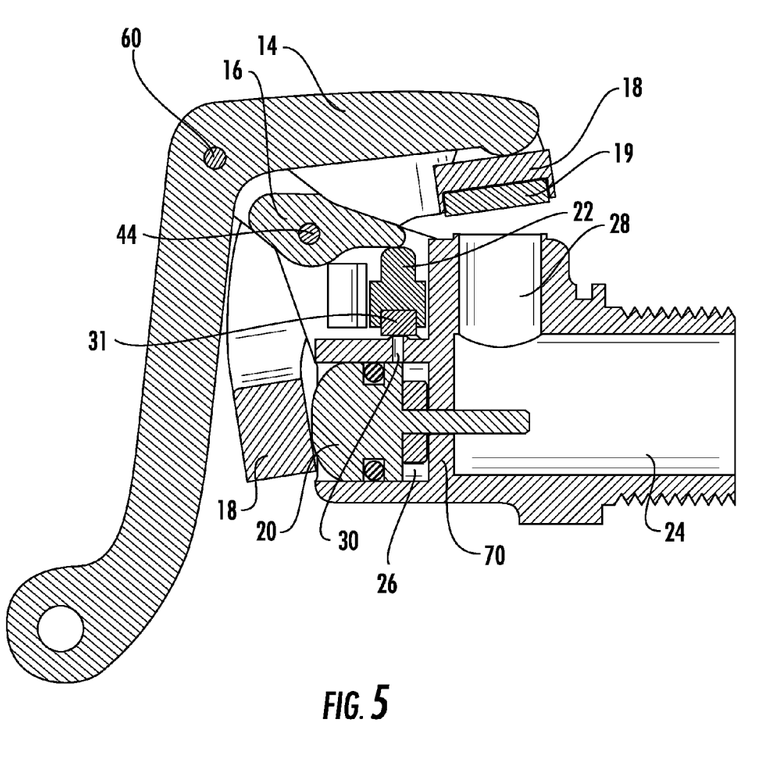
FIG. 5 is a cross-section view of the invention taken at line 1-1 of FIG. 1 showing the water valve at a partially open position when beginning the closing process.
Figure 6:
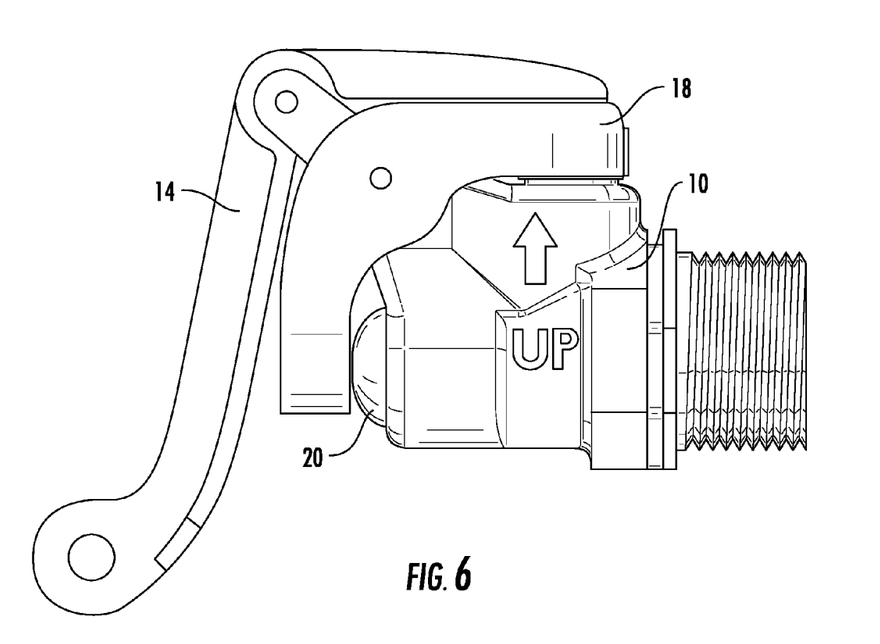
FIG. 6 is a side view of the invention.
Figure 7:
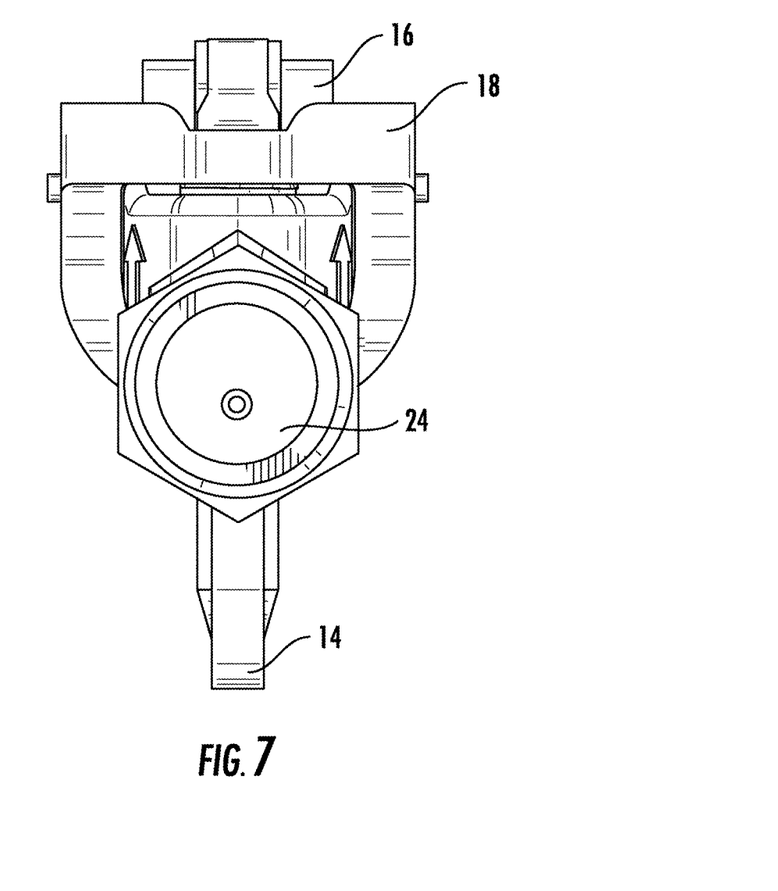
FIG. 7 is a front view of the invention.
Figure 8:
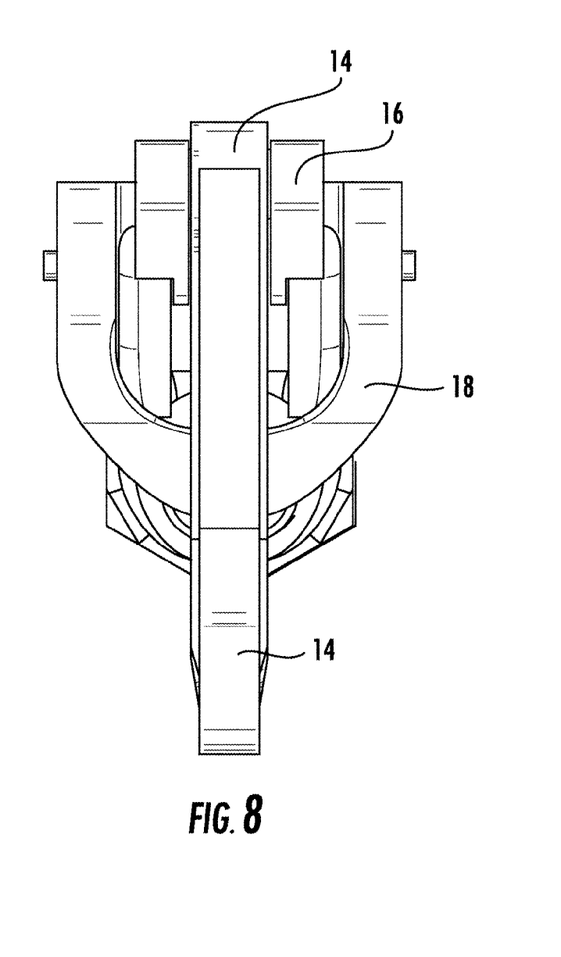
FIG. 8 is a back view of the invention.

As the water in the container begins to rise, eventually it will make contact with the float. FIG. 5 shows the valve 10 as it begins to close from the opened position. As the float begins to rise, the float arm 14 rise and will rotate around (clockwise in FIG. 5) the secondary fulcrum 60. The rotational movement of the float arm 14 causes the second section 38 to apply an increasing amount of pressure on the sealing member 18. Additionally the movement of the float arm 14 causes the lever 16 to rotate clockwise and put pressure on the pilot 22. The pressure on the pilot 22 cause it to be pushed downward which begins to close the opening 34 to the second passageway 30.

Figure 9:
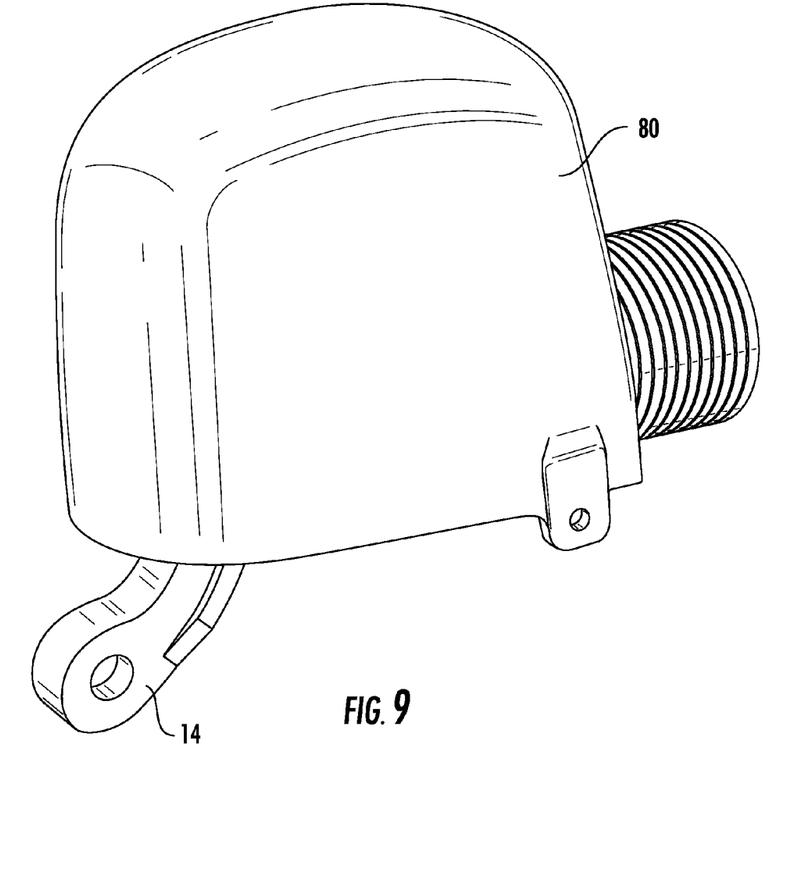
FIG. 9 is the invention covered by a hood.

As the water continues to rise, eventually the opening 34 is closed by the pilot 22 and water pressure then begins to increase on the piston 20. The piston 20 then moves away from the wall 70 and presses on the sealing member 18. The float arm 14 further rotates clockwise as the water rises, putting more pressure on the sealing member 18 until it closes the opening of the first passageway 28. Again, depending on the water pressure, the contribution of the piston and the float arm in maintaining a sufficient force to keep the first opening in a closed position will vary. FIG. 9 shows the valve 10 with a hood 80. The hood 80 deflects the water as it escapes the first opening of the first passageway 28 and/or the second opening 34 of the second passageway 30. Gravity then pulls the deflected water downward and in the case of a toilet tank begins to refill the tank.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:
1. A water valve, comprising:
a main body;
a float arm;
a first opening;
a second opening;
a piston;
a lever;
a sealing member;
the float arm exerting a first pressure on the sealing member wherein the first pressure at least partially maintains the valve in a closed position;
the piston exerting a second pressure on the sealing member wherein the second pressure at least partially maintains the valve in the closed position;

the lever exerting a first force on a seal wherein the first force is sufficient to prevent flow through the second opening in the closed position;
a primary fulcrum;
the sealing member and the lever pivotable around the primary fulcrum.

2. The water valve of claim 1, further comprising:
a secondary fulcrum;
the lever and the float arm pivotable around the secondary fulcrum.

3. The water valve of claim 2, wherein:
the first opening and the second opening allow water to flow when the valve is in an open position.

4. The water valve of claim 3, further comprising:
a first cavity;
a second cavity;
the first cavity in communication with a water source;
the second cavity in communication with the first cavity.

5. The water valve of claim 4, wherein:
the lever arm has a first section and a second section;
the first section is substantially perpendicular to the second section.

6. The water valve of claim 5, wherein:
the piston is movable in the second cavity;
wherein the piston's movement is dependent on a pressure exerted by the water source.

7. The water valve of claim 6, wherein:
the second opening is unblocked by the seal in the open position whereby water exits the second opening.

8. The water valve of claim 7, wherein:
the piston comprises a tail;
at least a portion of the tail movable between the first cavity and the second cavity whereby the tail can assist in cleaning debris.

9. The water valve of claim 8, wherein:
the lever comprises a first arm and a second arm.

10. The water valve of claim 9, wherein:
the float arm is connected to a float.

11. A water valve, comprising:
a body;
the body having a first cavity and a second cavity;
a passageway connecting the first cavity to the second cavity;
a piston at least partially within the second cavity;
the body comprising a first opening and a second opening;
the piston exerting a first force on a lever;
a float arm;
the float arm exerting a second force on the lever;
wherein the first force and second force together preventing a flow of a liquid through the first opening and the second opening when the valve is in a closed position;
the piston comprises a tail;
at least a portion of the tail movable between the first cavity and the second cavity whereby the tail can assist in cleaning debris in the valve.

12. A water valve, comprising:
a main body;
a float arm;
a piston;
a lever;
a sealing member;
the float arm exerting a first pressure on the sealing member wherein the first pressure at least partially maintains the valve in a closed position;
the piston exerting a second pressure on the sealing member wherein the second pressure at least partially maintains the valve in the closed position;
a primary fulcrum;
the sealing member and the lever pivotable around the primary fulcrum.

13. A water valve, comprising:
a main body;
a float arm;
a lever;
a piston;
a sealing member;
the float arm exerting a first pressure on the sealing member wherein the first pressure at least partially maintains the valve in a closed position;
the piston exerting a second pressure on the sealing member wherein the second pressure at least partially maintains the valve in the closed position;
the piston comprises a tail;
the valve further comprises a first cavity and a second cavity;
at least a portion of the tail movable between the first cavity and the second cavity whereby the tail can assist in cleaning debris and prolonging a life of the valve.

14. The water valve of claim 13, further comprising:
a pilot;
the lever exerting a force on the pilot wherein the force is sufficient to prevent flow through the second opening in the closed position.

15. The water valve of claim 14, further comprising:
a primary fulcrum;
the sealing member and the lever pivotable around the primary fulcrum.

* * * * *